(12) United States Patent
Nakamura

(10) Patent No.: US 8,104,377 B2
(45) Date of Patent: Jan. 31, 2012

(54) INDEX TABLE

(75) Inventor: Akihiro Nakamura, Kanazawa (JP)

(73) Assignee: Tsudakoma Kogyo Kabushiki Kaisha, Kanazawa-shi (JP)

( * ) Notice: Subject to any disclaimer, the term of this patent is extended or adjusted under 35 U.S.C. 154(b) by 338 days.

(21) Appl. No.: 12/446,873

(22) PCT Filed: Oct. 23, 2007

(86) PCT No.: PCT/JP2007/070618
§ 371 (c)(1),
(2), (4) Date: Apr. 23, 2009

(87) PCT Pub. No.: WO2008/059698
PCT Pub. Date: May 22, 2008

(65) Prior Publication Data
US 2010/0089201 A1    Apr. 15, 2010

(30) Foreign Application Priority Data
Nov. 14, 2006   (JP) ................................. 2006-307644

(51) Int. Cl.
*B23Q 16/06* (2006.01)
(52) U.S. Cl. ...................................... 74/813 R
(58) Field of Classification Search ................ 74/813 R, 74/825, 813 L; 269/55, 56, 61, 63, 73; 451/23
See application file for complete search history.

(56) References Cited

U.S. PATENT DOCUMENTS
4,159,658 A * 7/1979 Parkinson ................... 74/813 L
2003/0126942 A1 7/2003 Watanabe et al.
2006/0089089 A1* 4/2006 Kato et al. ...................... 451/23

FOREIGN PATENT DOCUMENTS
JP  2002-66877 A    3/2002
JP  2003-194156 A   7/2003
JP  2004-142023 A   5/2004

OTHER PUBLICATIONS

International Search Report of PCT/JP2007/070618, date of mailing Jan. 15, 2008.

* cited by examiner

*Primary Examiner* — Vicky Johnson
(74) *Attorney, Agent, or Firm* — Westerman, Hattori, Daniels & Adrian, LLP

(57) ABSTRACT

In an index table, a left-hand specification and a right-hand specification of a motor can be changed. As solving means, there is provided an index table 1 in which a rotating table 3 is rotatably supported at a frame 2 by a rotating shaft 10, a setting surface 5 is provided at the frame 2 orthogonally to a rotating table surface 4 of the rotating table 3, a motor 8 is disposed at a surface 6 among two surfaces (6, 7) of the frame 2 that are orthogonal to the rotating table surface 4 and the setting surface 5, an output shaft 9 of the motor 8 is connected to an end portion at a side of the surface 6 of the worm shaft 11 through transmitting elements (14, 15), the worm shaft 11 being orthogonal to the surface 6, and the motor 8 drives the rotating table 3 through the transmitting elements (14, 15), a worm 12 of the worm shaft 11, and a worm wheel 13, the worm wheel 13 being provided at the rotating shaft 10. The motor 8 is mountable to the other surface 7 by being removed from the surface 6 among the two surfaces (6, 7), and the output shaft 9 is connected to an end portion at a side of the other surface 7 of the worm shaft 11 through the transmitting elements (14, 15).

4 Claims, 9 Drawing Sheets

SECTION ALONG A-A

SECTION ALONG B-B

VIEW ALONG C-C

INDEX TABLE

TECHNICAL FIELD

The present invention relates to an index table that is set at a machine tool.

BACKGROUND ART

The following type of index table is available. In the index table, a setting surface, which is set to a machine tool, is provided at a frame orthogonally to a surface of a rotating table. A motor is disposed at either of two surfaces of respective side surface portions of the frame, the two surfaces being orthogonal to the surface of the rotating table and the setting surface. The motor is connected to a worm shaft orthogonal to this surface through a transmitting element. The motor drives a worm wheel, mounted to a rotating shaft of the rotating table, through the worm shaft, to drive the rotating table.

Specifications of this type of index table are related to the following devices. They are a device based on a right-hand specification, in which the motor is positioned on the right of the rotating shaft when the surface of the index table is seen from the front with the setting surface that is set to the machine tool being set at the lower side, and a device based on a left-hand specification, in which the motor is positioned on the left of the rotating shaft when the surface of the index table is seen from the front with the setting surface that is set to the machine tool being set at the lower side. Either one of these devices is selected in accordance with the machine tool to which it is mounted, to prevent processing of a workpiece from being restricted due to occupied space of the motor.

In this type of index table, depending upon a change in a processing condition such as a change of a machine tool to which the index table is mounted, the type of tool, or the shape of a workpiece, there may be a request at a working place to make it possible to change from the device based on the right-hand specification to that based on the left-hand specification or to change from the device based on the left-hand specification to that based on the right-hand specification. When such changes are made, there is a desire to use the worm wheel and the worm shaft without replacing them.

Therefore, in an index table discussed in Patent Document 1, of four surfaces that are orthogonal to a surface of a rotating table, excluding the surface from which a motor projects, two or three surfaces serve as surfaces that can be set to a machine tool. It is possible to change from the device based on the right-hand specification to the device based on the left-hand specification, and from the device based on the left-hand specification to the device based on the right-hand specification without replacing parts.

However, as mentioned above, when the setting surface that is set to the machine tool is changed from one setting surface to another, the perpendicularity between the surface of the rotating table and the setting surface may change. When the perpendicularity changes, processing precision of the workpiece is reduced. The setting surface that is not used is exposed. This may cause, for example, a tool or a workpiece to impair the state of the setting surface. Therefore, when a setting surface whose surface state is impaired is used, processing precision of the workpiece is reduced. Further, the worm shaft may be provided in the up-down direction, or may be provided above the rotating shaft. This may deteriorate an oil bath extending to a portion where a worm and a worm wheel engage each other, and an oil bath extending to bearings at two ends of the worm shaft. Consequently, wearing of and damage to the oil baths may occur early.

[Patent Document 1] Japanese Unexamined Patent Application Publication No. 2004-142023

DISCLOSURE OF INVENTION

Problems to be Solved by the Invention

Accordingly, the present invention makes it possible to change from a device based on a motor right-hand specification to that based on a motor left-hand specification, and from the device based on the motor left-hand specification to that based on the motor right-hand specification without impairing oil path performance or reducing processing precision of a workpiece, in an index table in which a frame is provided with a setting surface orthogonally to a surface of a rotating table and in which a motor that drives a worm shaft is disposed at either one of surfaces orthogonal to the surface of the rotating table and the setting surface.

Means for Solving the Problems

In view of the above-described problems, there is provided an index table (1) in which a rotating table (3) is rotatably supported at a frame (2) by a rotating shaft (10), a setting surface (5) is provided at the frame (2) orthogonally to a rotating table surface (4) of the rotating table (3), a motor (8) is disposed at a surface (6) among two surfaces (6, 7) of the frame (2) that are orthogonal to the rotating table surface (4) and the setting surface (5), an output shaft (9) of the motor (8) is connected to an end portion at a side of the surface (6) of the worm shaft (11) through transmitting elements (14, 15), the worm shaft (11) being orthogonal to the surface (6), and the motor (8) drives the rotating table (3) through the transmitting elements (14, 15), a worm (12) of the worm shaft (11), and a worm wheel (13), the worm wheel (13) being provided at the rotating shaft (10), wherein the motor (8) is mountable to the other surface (7) by being removed from the surface (6) among the two surfaces (6, 7) of the frame (2), and the output shaft (9) of the motor (8) is connected to an end portion at a side of the other surface (7) of the worm shaft (11) through the transmitting elements (14, 15) (Claim 1).

In addition, when the motor (8) is mounted to the other surface (7) of the frame (2), the worm wheel 13 is mounted to the rotating shaft 10 in an opposite direction, and the worm shaft (11) is mounted to the frame (2) in an opposite direction (Claim 2).

The both end portions of the worm shaft (11) are formed so as to be connectable to the output shaft (9) of the motor (8) through the transmitting elements (14, 15), and, when the motor (8) is mounted to the other surface (7) of the frame (2), one of the end portions of the worm shaft (11) and the output shaft (9) of the motor (8) are disconnected from each other, and the other end portion of the worm shaft (11) and the output shaft (9) of the motor (8) are connected to each other (Claim 3).

The worm shaft (11) is provided so that a tooth thickness of the worm (12) gradually increases or decreases along an axial direction; in two bearing accommodation members (18, 89) fitted to accommodation holes (16) and supporting the respective end portions of the worm shaft (11) through bearings (17, 88), the bearing accommodation member (18) that is fitted to the accommodation hole (16) at the side of the other surface (7) is such that a movement thereof relative to the worm shaft (11) is restricted in an axial direction and such that a securing position thereof with respect to the frame (2) is adjustable in the axial direction, the accommodation holes

(16) being provided at the side of the surface (6) and at the side of the other surface (7) of the frame (2), the accommodation holes (16) having the same diameter; when the motor (8) is mounted to the other surface (7) of the frame (2), the bearing accommodation member (18) is removed from the accommodation hole (16) of the surface (7) and is fitted to the accommodation hole (16) of the surface (6); and, by adjusting the securing position of the bearing accommodation member (18) with respect to the frame (2), a position of the worm shaft (11) in the axial direction is adjusted, so that an engagement clearance between the worm (12) and the worm wheel (13) is adjusted (Claim 4).

The rotating shaft (10) is provided with a flat worm wheel mounting reference surface (19) that spreads in a radial direction, the worm wheel (13) is provided with rotating shaft mounting reference surfaces (20) at respective end portions thereof, both of the rotating shaft mounting reference surfaces (20) are provided at equal distances in an axial direction from a center of curvature of teeth of the worm wheel (13), and the worm wheel mounting reference surface (19) is selectively in contact with one of the rotating shaft mounting reference surfaces (20) (Claim 5).

Advantages

An index table (1) in which a rotating table (3) is rotatably supported at a frame (2) by a rotating shaft (10), a setting surface (5) is provided at the frame (2) orthogonally to a rotating table surface (4) of the rotating table (3), a motor (8) is disposed at a surface (6) among two surfaces (6, 7) of the frame (2) that are orthogonal to the rotating table surface (4) and the setting surface (5), an output shaft (9) of the motor (8) is connected to an end portion at a side of the surface (6) of the worm shaft (11) through transmitting elements (14, 15), the worm shaft (11) being orthogonal to the surface (6), and the motor (8) drives the rotating table (3) through the transmitting elements (14, 15), a worm (12) of the worm shaft (11), and a worm wheel (13), the worm wheel (13) being provided at the rotating shaft (10). In the index table (1), the motor (8) is mountable to the other surface (7) by being removed from the surface (6) among the two surfaces (6, 7) of the frame (2), and the output shaft (9) of the motor (8) is connected to an end portion at a side of the other surface (7) of the worm shaft (11) through the transmitting elements (14, 15). Therefore, it is possible to change a specification without replacing the worm shaft (11) and the worm wheel (13) and without reducing processing precision of a workpiece and impairing oil bath performance (Claim 1).

When the motor (8) is mounted to the other surface (7) of the frame (2), the worm wheel (13) is mounted to the rotating shaft (10) in an opposite direction, and the worm shaft (11) is mounted to the frame (2) in an opposite direction. Therefore, it is possible to use the desired specification (Claim 2).

The both end portions of the worm shaft (11) are formed so as to be connectable to the output shaft (9) of the motor (8) through the transmitting elements (14, 15), and, when the motor (8) is mounted to the other surface (7) of the frame (2), one of the end portions of the worm shaft (11) and the output shaft (9) of the motor (8) are disconnected from each other, and the other end portion of the worm shaft (11) and the output shaft (9) of the motor (8) are connected to each other. Therefore, it is possible to use the desired specification (Claim 3).

The worm shaft (11) is provided so that a tooth thickness of the worm (12) gradually increases or decreases along an axial direction; in two bearing accommodation members (18, 89) fitted to accommodation holes (16) and supporting respective ends of the worm shaft (11) through bearings (17, 88), the bearing accommodation member (18) that is fitted to the accommodation hole (16) at the side of the other surface (7) is such that a movement thereof relative to the worm shaft (11) is restricted in the axial direction and such that a securing position thereof with respect to the frame (2) is adjustable in the axial direction, the accommodation holes (16) being provided at the side of the surface (6) and at the side of the other surface (7) of the frame (2), the accommodation holes (16) having the same diameter; when the motor (8) is mounted to the other surface (7) of the frame (2), the bearing accommodation member (18) is removed from the accommodation hole (16) of the surface (7) and is fitted to the accommodation hole (16) of the surface (6); and, by adjusting the securing position of the bearing accommodation member (18) with respect to the frame (2), a position of the worm shaft (11) in the axial direction is adjusted, so that an engagement clearance between the worm (12) and the worm wheel (13) is adjusted. Therefore, it is possible to adjust the engagement state to an optimal engagement state, and to adjust the securing position of the bearing accommodation member (18) without interference by the motor (8) as in the case prior to changing the specification at the side of the surface 6 (Claim 4).

The rotating shaft (10) is provided with a flat worm wheel mounting reference surface (19) that spreads in a radial direction, the worm wheel (13) is provided with rotating shaft mounting reference surfaces (20) at respective end portions thereof, both of the rotating shaft mounting reference surfaces (20) are provided at equal distances in an axial direction from a center of curvature of teeth of the worm wheel (13), and the worm wheel mounting reference surface (19) is selectively in contact with one of the rotating shaft mounting reference surfaces (20). Therefore, the precision with which the worm wheel (13) and the worm (12) engaged each other is maintained without changing the position where the worm wheel (13) is mounted to the rotating shaft (10) (Claim 5).

BEST MODES FOR CARRYING OUT THE INVENTION

Best illustrative embodiments of an index table 1 according to the present invention can be realized by first and second embodiments. FIGS. 1 to 7 correspond to the first embodiment, and FIGS. 8 and 9 correspond to the second embodiment. The structure according to the first embodiment corresponds to those in Claims 1, 2, 4, and 5; and the structure according to the second embodiment corresponds to those in Claims 1, 3, and 4. The first and second embodiments will hereunder be described in detail in that order.

First Embodiment

Figure 6:
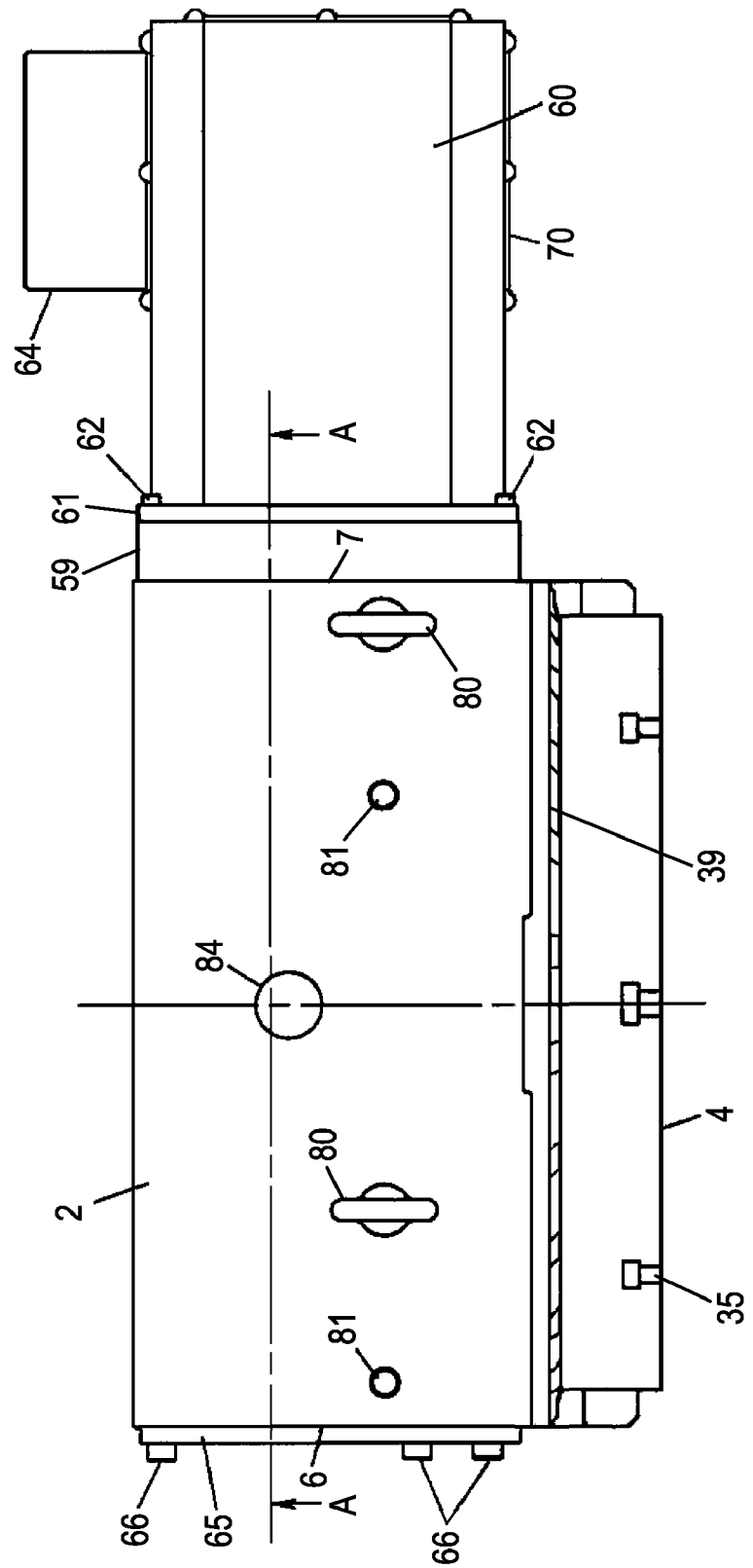
FIG. 6 is a plan view of an index table 1 based on a right-hand specification in the first embodiment.
Figure 7:
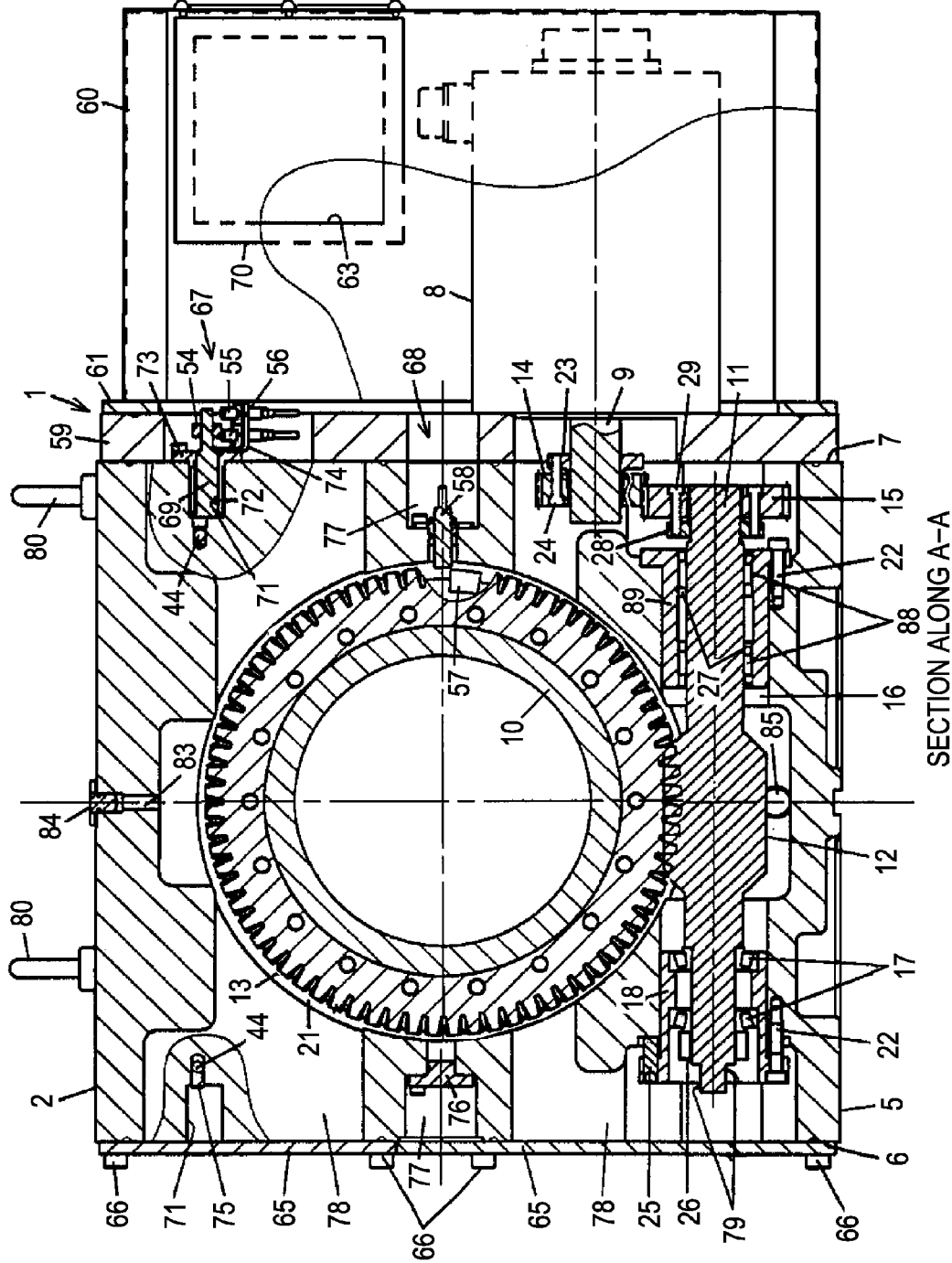
FIG. 7 is a sectional view taken along A-A in FIG. 6.

Regarding index tables 1 according to the first embodiment shown in FIGS. 1 to 7, FIGS. 1 to 5 show the index table 1 based on a left-hand specification, and FIGS. 6 and 7 show the index table 1 based on a right-hand specification. Each index table 1 comprises, for example, a rectangular parallelepiped frame 2, a rotating table 3, a motor 8, a worm shaft 11, and a worm wheel 13. The rotating table 3 is rotatably supported by the frame 2, and a workpiece (not shown) is secured to and supported by the rotating table 3. The motor 8 is mounted to a side portion of the frame 2 for driving the rotating table 3 and indexing it to a predetermined angle. The worm shaft 11 is built in the interior of the frame 2 for transmitting rotation of the motor 8 to the rotating table 3 while reducing speed. The worm wheel 13 engages a worm 12 of the worm shaft 11.

In the index table 1 based on the left-hand specification shown in FIGS. 1 to 5, when the rotating table 3 is viewed from the front, the motor 8 is disposed at a left side portion of the frame 2, whereas, in the index table 1 based on the right-hand specification shown in FIGS. 6 and 7, the motor 8 is disposed at a right side portion of the frame 2. For convenience, in describing the structure of each index table 1, the index table 1 based on the left-hand specification shown in FIGS. 1 to 5 will described, and the structure of the index table 1 based on the right-hand specification shown in FIGS. 6 and 7 will be described when changing from the left-hand specification to the right-hand specification.

The rotating table 3 has a rotating table surface 4 for mounting a workpiece. The rotating table surface 4 is disposed at the front surface of the frame 2 so as to be parallel thereto, and is fitted and integrated to a rotating shaft 10. The rotating shaft 10 is rotatably supported at the frame 2. The frame 2 is a rectangular parallelepiped frame, with its lower surface being a setting surface 5 that is set to a machine tool and that is orthogonal to the rotating table surface 4 of the rotating table 3. The left side portion surface and the right side portion surface of the frame 2, which are parallel to each other and which are orthogonal to the rotating table surface 4 and the setting surface 5, constitute a surface 6 and a surface 7 for mounting the motor 8 thereto.

The frame 2 has two accommodation holes 16 and an accommodation space 21. The two accommodation holes 16 open at the two surfaces 6 and 7, respectively. The accommodation space 21 is positioned above the accommodation holes 16 and accommodate the worm wheel 13 and the rotating shaft 10. The two accommodation holes 16 accommodate, respectively, a bearing accommodation member 18 and a bearing accommodation member 89, which support respective ends of the worm shaft 11. The frame 2 has an engagement space between the accommodation holes 16. In this space, the accommodation holes 16 and the accommodation space 21 communicate with each other; and the worm wheel 13, secured to the rotating shaft 10, and the worm 12 at the central portion of the worm shaft 11 engage each other, when the worm 12 is disposed below the worm wheel 13. In the embodiment, the tooth thickness of the worm 12 is gradually increased or decreased along an axial direction. The right side portion and the left side portion of the frame 2 are symmetrically formed on the left side and right side of a plane passing through the rotating shaft 10 orthogonally to the setting surface 5. In particular, the diameters of the right and left accommodation holes 16 to which the two bearing accommodation members 18 and 89 are fitted are the same. When the diameters of the two bearing accommodation members 18 and 89 are the same, the bearing accommodation members 18 and 89 can be reattached at the right and left sides.

The motor 8 has a mounting surface, and can be disposed at either one of the two surfaces 6 and 7. In the left-hand specification, the motor 8 is mounted to the surface 6 of the frame 2 with, for example, a mounting screw (not shown). An output shaft 9 of the motor 8 in the present embodiment is orthogonal to the mounting surface. By mounting the mounting surface to the surface 6 or the surface 7, it becomes orthogonal to the surface 6 or the surface 7, and moves into the frame 2 from an open portion of the accommodation hole 16. In the frame 2, the output shaft 9 is connected to the worm shaft 11, which is orthogonal to the surface 6, through a gear 14 and a gear 15. The gear 14 serves as a transmitting element secured to the output shaft 9. The gear 15 serves as a transmitting element secured to the left end of the worm shaft 11. The transmitting elements are not limited to the gears 14 and 15, so that they may be other components, such as couplings, in accordance with rotation transmission modes.

The motor 8 is covered with a motor cover 60. At a portion of a base 61 that is welded to an open edge of the motor cover 60, through a distance 59 and using a bolt 62, the motor cover 60 is mounted to the left surface 6 of the frame 2 when the left-hand specification is used, whereas the motor cover 60 is mounted to the right surface 7 when the right-hand specification is used. Excluding a terminal cover 64 and a window cover 70 of a terminal window 63 for the opposite specification, the motor cover 60 is symmetrically formed with respect to a plane that passes through the output shaft 7 of the motor 8 orthogonally to the setting surface 5. When the right-hand specification and the left-hand specification are to be changed, the terminal cover 64 and the window cover 70 are reattached.

As described above, the worm shaft 11 is orthogonal to the two surfaces 6 and 7 and is positioned below the rotating shaft 10. The output shaft 9 of the motor 8 drives the rotating table 3 on the basis of a large speed reduction ratio through the gears 14 and 15, the worm 12 of the worm shaft 11, and the rotating shaft 10 integrated to the worm wheel 13.

Figure 1:
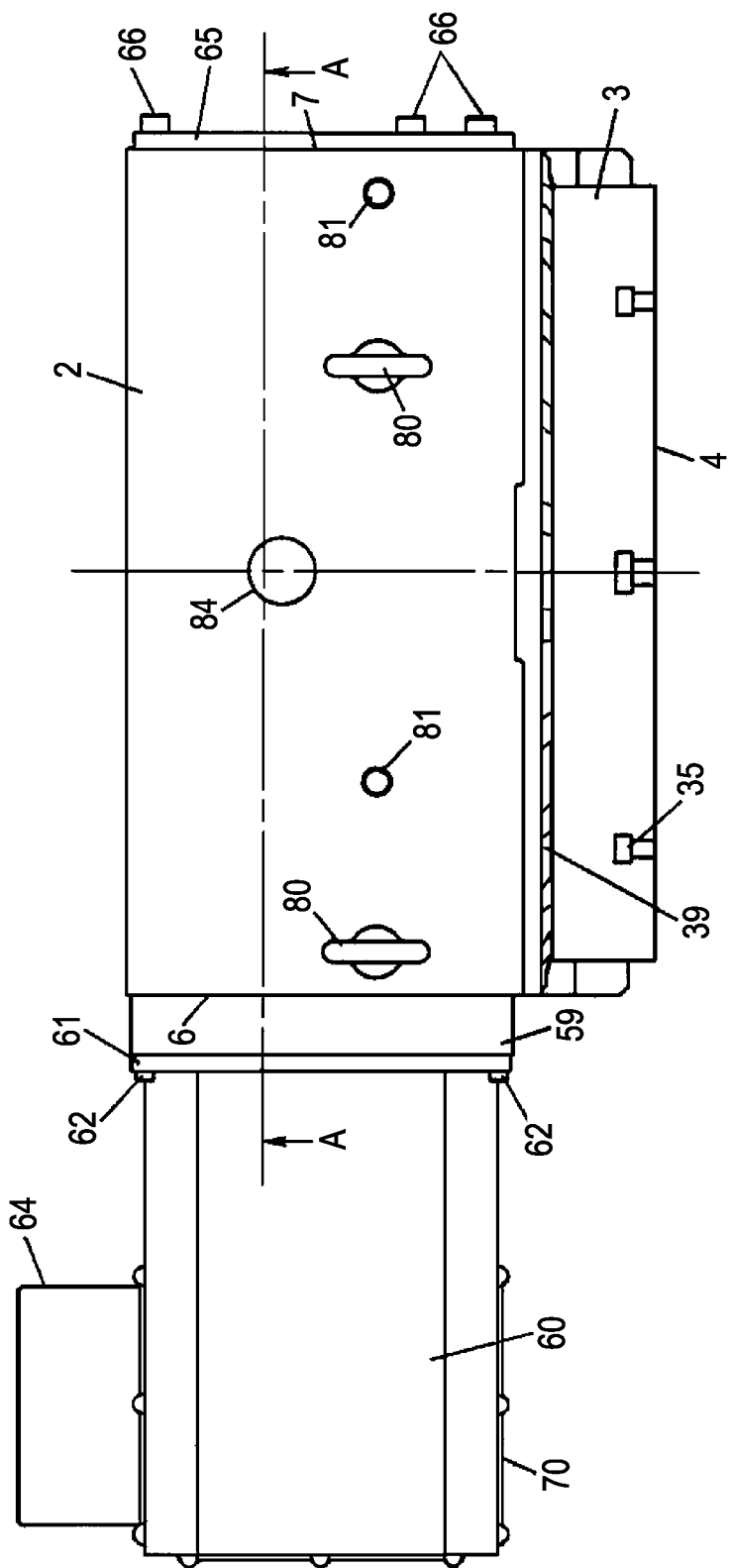
FIG. 1 is a plan view of an index table 1 based on a left-hand specification in a first embodiment of the present invention.
Figure 2:
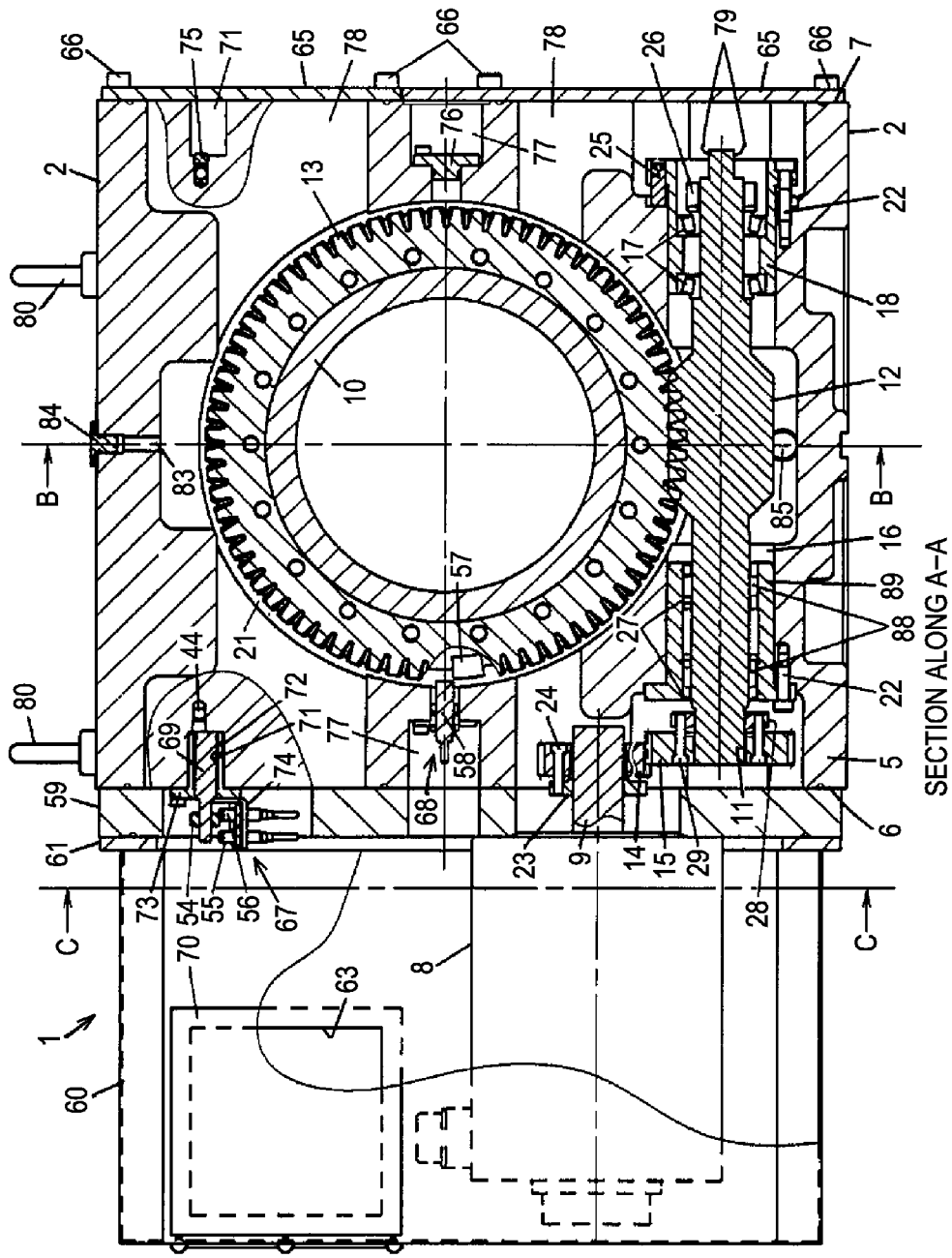
FIG. 2 is a sectional view taken along A-A in FIG. 1.
Figure 3:
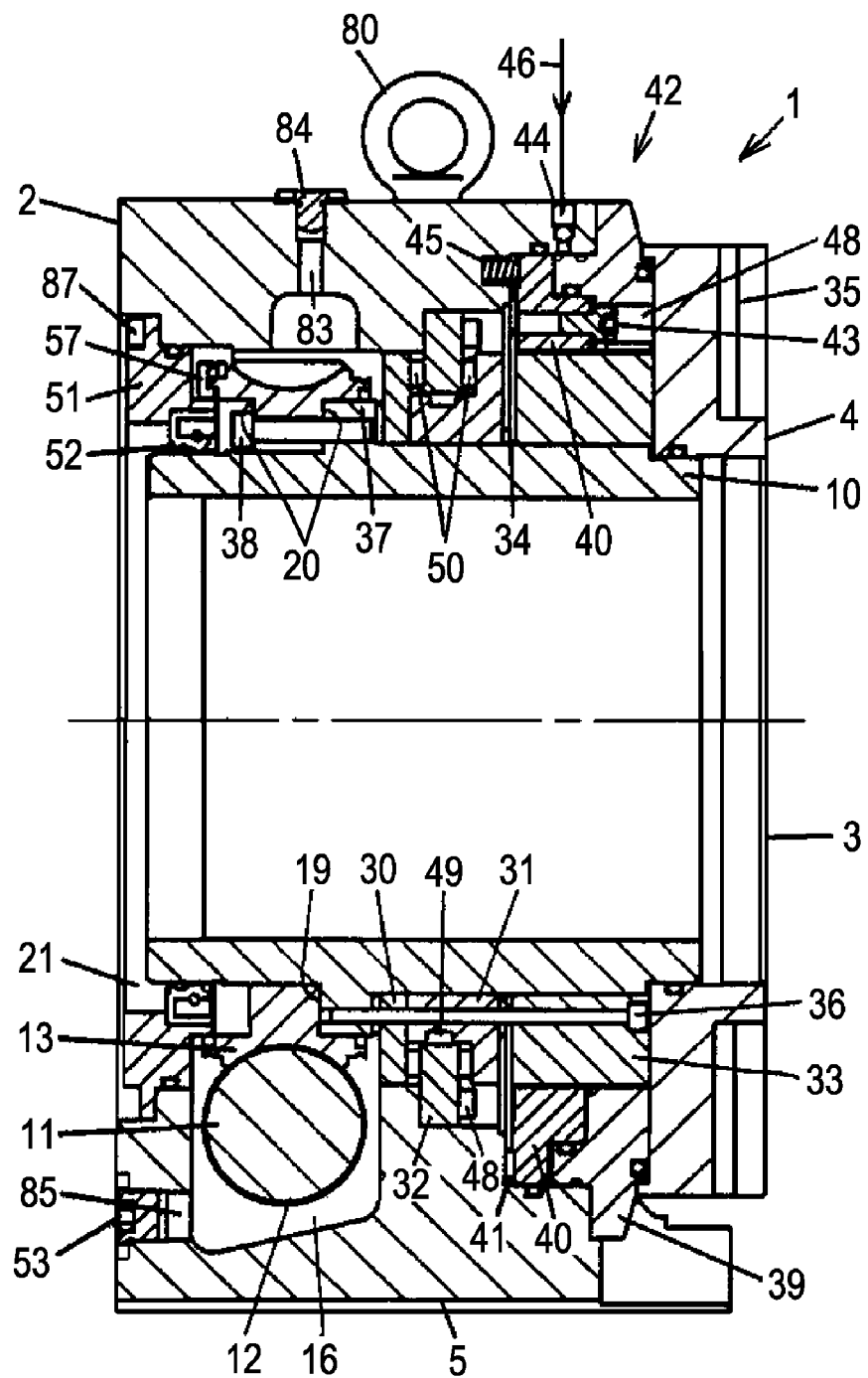
FIG. 3 is a sectional view taken along B-B in FIG. 2.

The gear 14 is mountably formed at a surface-6-side end portion, that is, a motor-8-side end portion in FIG. 2 of the worm shaft 11. A pair of parallel flat surfaces 79 are formed at a surface-7-side end portion, that is, an end portion at a side further away from the motor 8 in FIG. 2 of the worm shaft 11. In, for example, adjusting an engagement clearance, it is possible to rotate the worm shaft 11 with one's hand through a tool, such as a spanner, by holding the tool at the flat surfaces 79. An inner peripheral surface of the gear 14 is a tapered surface. The gear 14 is integrated to a gear mounting member 23, having a tapered sleeve, through a mounting bolt 24. The diameter of an inner peripheral surface of the gear mounting member 23 is reduced by tightening force of the securing bolt 24. The gear mounting member 23 is secured to the output shaft 9 of the motor 8, so that the gear 14 is secured to the output shaft 9 of the motor 8. Similarly, the gear 15 is secured to the motor-8-side end portion of the worm shaft 11 by a securing bolt 29.

Through a needle bearing 88 and tapered roller bearings 17 that are held, the bearing accommodation members 18 and 89 that support the respective end portions of the worm shaft 11 are accommodated in the respective accommodation holes 16 having the same diameter at the respective surfaces 6 and 7. The motor-side needle bearing 88 is mounted to the bearing accommodation member 89 by, for example, a stop ring 27. Relative movement of the needle bearing 88 in an axial direction with respect to the bearing accommodation member 89 is restricted. A restricting member in the axial direction, such as a stop ring, is not provided between the needle bearing 88 and the worm shaft 11, so that movement of the needle bearing 88 in the axial direction relative to the worm shaft 11 is not restricted. An external thread is formed at the end portion at the side further away from the motor 8 of the worm shaft 11. Movement in the axial direction of the two tapered roller bearings 17 at the side further away from the motor is restricted by a stepped portion, a bearing restricting member 26, and a distance portion; and the tapered roller bearings 17 are mounted to the worm shaft 11. The stepped portion is formed at a central side of the worm shaft 11. The bearing restricting member 26 has an internal thread at an inner peripheral surface thereof and its securing position with respect to the worm shaft 11 can be arbitrarily adjusted. The distance portion is formed at the inner peripheral surface of the bearing accommodation member 18 between the tapered roller bearings 17. Therefore, relative movement in the axial direction of the worm shaft 11 with respect to the bearing accommodation member 18 at the side further away from the motor is restricted through the two tapered roller bearings 17, disposed at the side further away from the motor, and the distance portion, formed between the tapered roller bearings 17.

The bearing restricting member 26 has a thin-walled portion at a side further away from the bearings. By tightening the thin-walled portion by a hexagon socket head bolt screwed in a bearing-side end portion, the diameter of the internal thread at the inner peripheral surface is reduced at the thin-walled portion. Therefore, since rotation of the bearing restricting member 26 relative to the worm shaft 11 to which it is screwed is restricted, the bearing restricting member 26 is secured to the worm shaft 11 and restricts the movement of the bearings 17 in the axial direction thereof.

The left and right bearing accommodation members 18 are both mounted to the open portions of the accommodation holes 16 by bearing mounting bolts 22. However, the position of the bearing accommodation member 18 disposed at the side further away from the motor (right side) can be adjusted in the axial direction by pushing an end of a hexagon-socket-head clearance adjusting bolt 25 against a peripheral surface of the open portion of the accommodation hole 16. The clearance adjusting bolt 25 is screwed to an internal thread of the bearing accommodation member 18. As mentioned above, the bearing accommodation member 18 that is disposed at the side further away from the motor and that restricts relative movement of the worm shaft 11 in the axial direction is fitted to the accommodation hole 16 disposed at the side further away from the motor, and a screwing length of the clearance adjusting bolt 25 is adjusted, to provide this bearing accommodation member 18 so that its securing position with respect to the frame 2 can be adjusted in the axial direction.

When a tooth surface of the worm 12 or a tooth surface of the worm wheel 13, which is more easily worn than the worm 12, becomes worn due to a long-period operation of the index table 1, engagement clearance therebetween becomes large, thereby reducing indexing precision of the index table 1. Therefore, it is necessary to periodically adjust the engagement clearance between the worm wheel 13 and the worm 12.

By adjusting the position of the bearing accommodation member 18 at the side further away from the motor (right side) in the axial direction, the worm 12 whose tooth thickness is gradually increased or decreased in the axial direction of the worm shaft 11 moves in the axial direction, and the worm wheel 13 engages the worm 12 having a proper tooth thickness, so that the engagement clearance between the worm 12 and the worm wheel 13 is adjusted. In FIG. 2, the tooth thickness of the worm 12 increases towards the right side of the worm 12. Therefore, when the engagement clearance is increased, the screwing length of the clearance adjusting bolt 25 whose end strikes the frame 2 and which acts as a stopper is reduced. In this state, the bearing mounting bolts 22 are tightened, to move the bearing accommodation member 18 towards the left with respect to the frame 2. With the movement of the bearing accommodation member 18, the worm shaft 11 whose movement relative to the bearing accommodation member 18 in the axial direction is restricted moves towards the left. The leftward movement of the worm shaft 11 causes the worm wheel 13 to engage a portion having a large tooth thickness of the worm 12. This adjusts the engagement clearance between the worm 12 and the worm wheel 13 so that it becomes small.

One example of the rotating shaft 10 is a hollow cylinder. The rotating shaft 10 is accommodated in the accommodation space 21 of the frame 2. At an end portion at the front side, the rotating shaft 10 is integrally formed with the rotating table 3. At an intermediate outer peripheral portion, it is integrally formed with a space ring 33, a clamp plate 34, a roller supporting ring 30 having a flange portion and a body whose diameter is smaller than that of the flange portion, and a roller supporting ring 31. At en end portion situated further back, it is integrally formed with the worm wheel 13.

The rotating table 3 is, for example, annular. For mounting a workpiece holding jig mounted to its front surface, the rotating table 3 has a plurality of T grooves 35 extending radially from a convergent point serving as an axial center. The rotating table 3 is fitted to the front end portion of the rotating shaft 10, and is secured to the rotating shaft 10 with a mounting screw (not shown). The space ring 33, the clamp plate 34, and the two roller supporting rings 30 and 31 are mounted to a front surface of a mounting flange 37, formed at the outer periphery of the rotating shaft 10, with a hexagon-socket-head bolt 36.

A roller supporting ring 32, secured to the frame 2 with a hexagon-socket-head bolt 48, is disposed between the flange portion of the roller supporting ring 30 and the roller supporting ring 31. A thrust-direction roller bearing 50 is held between the flange portion of the roller supporting ring 30 and the roller supporting ring 32, and a thrust-direction roller bearing 50 is held between the flange portion of the roller supporting ring 30 and the roller supporting ring 31. A radial-direction roller bearing 49 is held between an inner peripheral surface of the roller supporting ring 32 and a body of the roller supporting ring 31. In this way, in the accommodation space 21 of the frame 2, the rotating shaft 10 is rotatably supported while being stationary in the axial direction.

Using a mounting bolt 87, an oil seal holder 51 is secured to the open portion of the back surface at the accommodation space of the frame 2. The oil seal holder 51 and an outer peripheral portion of a back end portion of the rotating shaft 10 are sealed by an oil seal 52. Two pairs of hook internal threads 81 are provided at the upper surface of the frame 2. By changing the pair of hook internal threads 81 into which a pair of hooks 80 are screwed due to a change in the specification type, in the case in which the index table 1 is moved when, for example, mounting it to a different machine tool, the index table 1 can be safely raised and moved. In addition, an oil inlet port 83, which communicates with the accommodation holes 16 and the accommodation space 21, and an oil inlet port stop 84, which closes the oil inlet port 83, are provided at an upper portion of the frame 2. A drain 85 and a drain plug 53 for closing the drain 85 are mounted to bottom portions of the accommodation holes 16.

The worm wheel 13 is inserted with respect to the rotating shaft 10 from its rear-side end portion, and is mounted to a surface of the rotating shaft 10 at a rear side of the mounting flange 37 with a hexagon-socket-head bolt 38. A flat worm wheel mounting reference surface 19 spreading in a radial direction of the rotating shaft 10 is provided at a rear-side surface of the mounting flange 37, and rotating shaft mounting reference surfaces 20 are provided on respective end surfaces of the worm wheel 13 in correspondence with the worm wheel mounting reference surface 19.

Both of the rotating shaft mounting reference surfaces 20 are provided at equal distances in the axial direction from the center of curvature of the teeth of the worm wheel 13. Therefore, even if the worm wheel 13 has its rotation reversed with respect to the rotating shaft 10 by 180 degrees, that is, even if the worm wheel 13 is reversed and mounted in the opposite direction, the position of the center of curvature of the teeth of the worm wheel 13 is maintained with respect to the worm wheel mounting reference surface 19 in the axial direction of the rotating shaft 10. In this way, the worm wheel mounting reference surface 19 of the mounting flange 37 is mountable while it is selectively in contact with either one of the rotating shaft mounting reference surfaces 20 of the worm wheel 13 in accordance with a mounting direction.

When an annular cap 39 is inserted in the space ring 33, it is mounted to a front open side of the frame 2 by securing means (not shown). The annular cap 39, the space ring 33, and the frame 2 are integrally formed, to form a piston accommodation space 41 for accommodating a clamping piston 40. The clamping piston 40 is accommodated in the piston accommodation space 41, and a plurality of piston guides 43 are secured to the clamping piston 40. Flange portions of the piston guides 43 are inserted into through holes of the annular cap 39, so that relative movement thereof with respect to the frame 2 is restricted while it is movable in the axial direction of the rotating shaft 10. The clamping piston 40 receives resilient force of a plurality of compression coil springs 45, and is biased in a forward direction. The piston guides 43 are hexagon-socket-head bolts whose flange portions are mechanically processed, and are screwed into and secured to the piston 40.

When, after rotating the rotating table 3 by a predetermined index angle, clamp operating oil 46 is supplied from a clamp operating oil inlet port 44 of the frame 2 to a front chamber of the piston accommodation space 41, the clamping piston 40 moves towards the rear against the resilient force of the compression coil springs 45, so that the clamp plate 34, which is integrated to the rotating shaft 10, is pushed against the surface of the frame 2. This causes the rotating shaft 10 to be integrated to the frame 2 and to be clamped, causing the rotating table 3 to be in an unrotatable state and to be maintained at the predetermined index angle. The lamp plate 34, the clamping piston 40, the piston accommodation space 41, the piston guides 43, the compression coil springs 45, a supplying unit of the clamp operating oil 46 (not shown), etc. constitute a clamping device 42 for maintaining the rotating table 3 at the predetermined index angle.

A clamp/unclamp state of the clamping device is detected by a clamp operation detecting device 67. The clamp operation detecting device 67 includes a clamp detection piston 69, which moves by pressure of the clamp operating oil 46, a clamp detection portion 54, secured to the clamp detection piston 69, and two clamp detection proximity sensors 55 and 56, which detect the position of the clamp detection portion 54. Of a piston chamber 71 provided at a motor-8 side of the frame 2 and a piston chamber 71 provided at a side of the frame 2 further away from the motor 8, the piston chamber 71 at the motor-8 side communicates with the clamp-operating-oil-4 inlet port 44, whereas the piston chamber 71 at the side further away from the motor 8 is closed by a stop 75. The clamp detection piston 69 is supported at the motor-8 side of the frame 2 by a piston holder 73, is movably inserted into the piston chamber 71, and is biased by the compression coil springs 72 in a direction opposing the pressure of the clamp operating oil 46.

The two clamp detection proximity sensors 55 and 56 are mounted to the piston holder 73 by a sensor bracket 74. If the left-hand specification is used, the clamp detection piston 69, the two clamp detection proximity sensors 55 and 56, etc., are mounted to the left surface 6. Detection signals of the sensors 55 and 56 are sent to a controlling device of a machine tool, to prevent a workpiece from being processed when the rotating table 3 is not sufficiently clamped due to failure of the supplying unit of the clamp operating oil 46.

Figure 4:
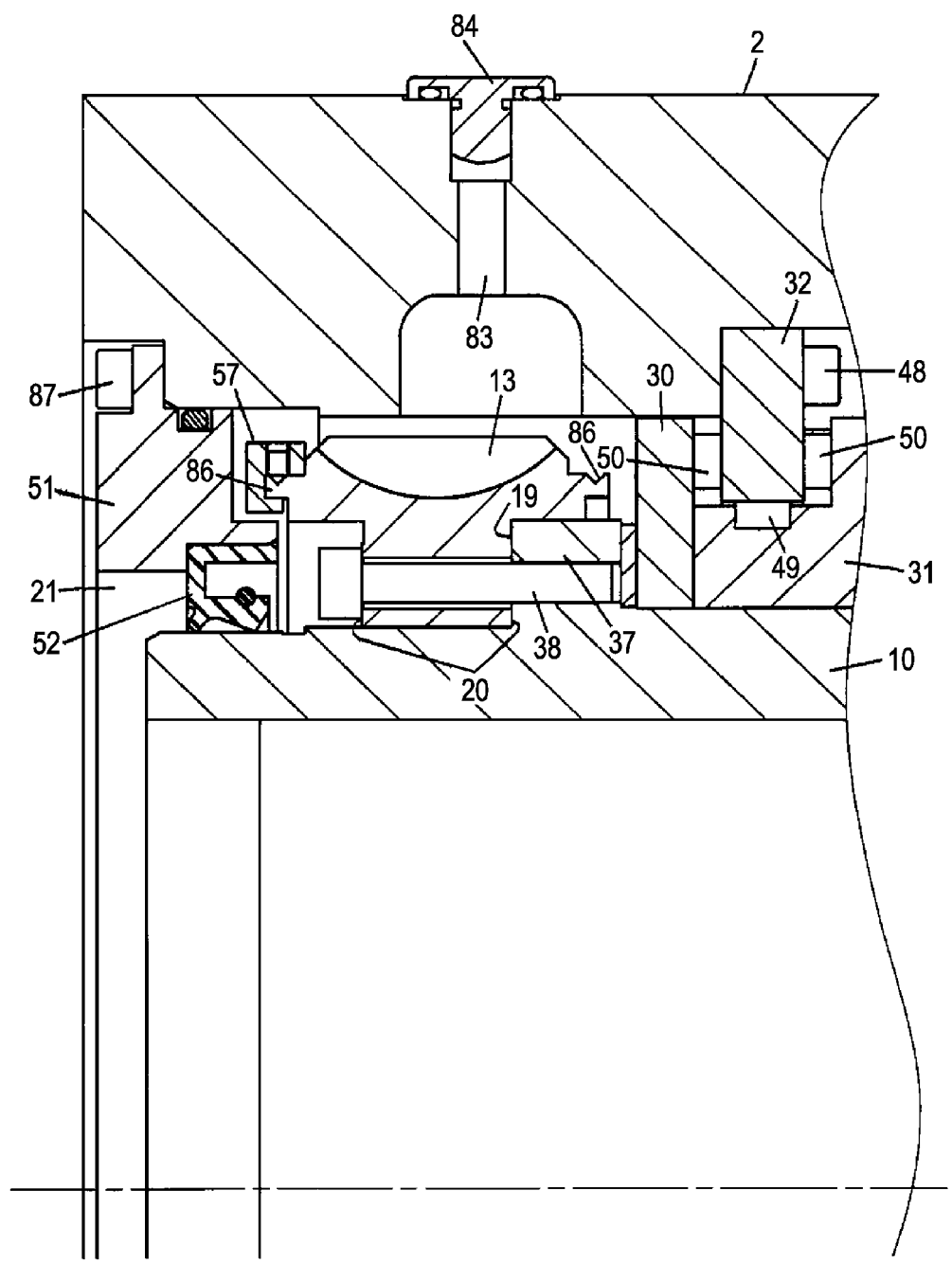
FIG. 4 is an partial enlarged sectional view of FIG. 3.
Figure 5:
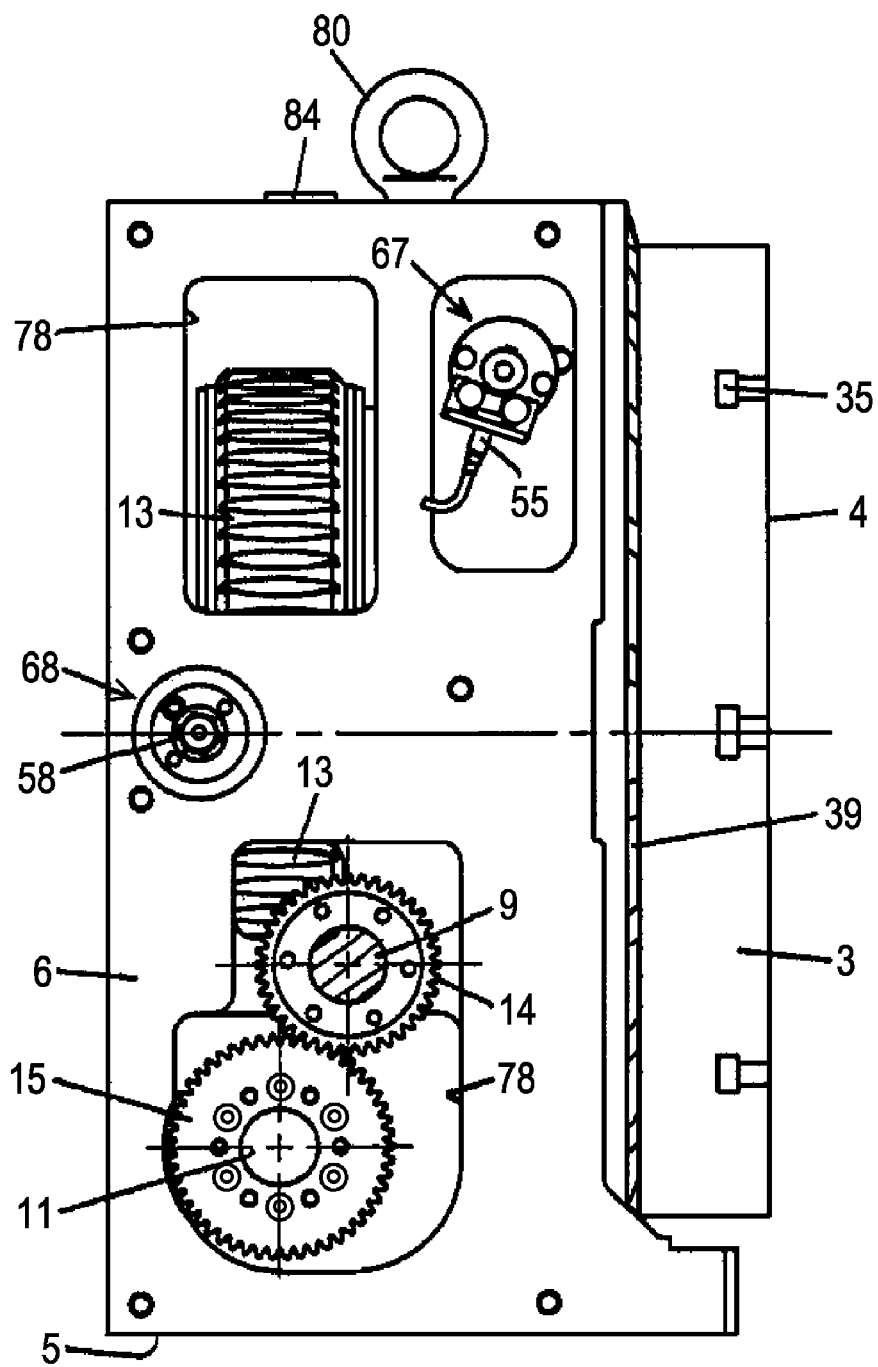
FIG. 5 is a side view in a direction C-C in FIG. 2 when a motor 8 is in a removed state.

As shown in FIGS. 2 and 4, a position of origin of rotation of the rotating table 3 is detected by detecting an origin detection portion 57, secured to one of flange portions 86 provided at respective edges of the teeth of the worm wheel 13, with an origin proximity sensor 58, secured to either of mounting hollows 77 of the frame 2. The mounting hollows 77 are formed at both the left surface 6 and the right surface 7. If the left-hand specification is used, the origin proximity sensor 58 is mounted to the mounting hollow 77 at the left surface 6, and the mounting hollow 77 at the right surface 7 is closed by a stop member 76. The origin detection portion 57 and the origin proximity sensor 58 constitute an origin setting device 68 of the rotating table 3.

The accommodation hole 16 at the right side portion of the frame 2 and an opening 78 of the accommodation space 21, the piston chambers 71, and the mounting hollows 77 are shielded from the outside by mounting two covers 65, disposed at an upper position and a lower position with respect to each other, to the frame 2 with mounting bolts 66; and are hermetically sealed through a sealing material, such as an O ring.

As mentioned above, the right and left portions of the frame 2 are symmetrically formed on the right and left side of a plane passing through the rotating shaft 10 orthogonally to the setting surface 5. In particular, the diameters of the accommodation holes 16 to which the two bearing accommodation members 18 and 89 are fitted are the same. Therefore, the distance 59, the clamp operation detecting device 67, the origin setting device 68 of the rotating table 3, the output shaft 9 of the motor 8, the gear 14, secured to a shaft end of the output shaft 9, the gear 15, secured to one end of the worm shaft 11, the two bearing holder accommodation members 18 and 89, and the two covers 65 can be mounted to or accommodated in the right portion and the left portion. In this embodiment, the clamp operation detecting device 67 and the origin setting device 68 of the rotating table 3 are mountable to the right portion and the left portion. Here, they may each be mounted to only one of the right and left portions without forming the frame 2 symmetrically on the left side and right side. In this case, when specifications are those in which the motor cover 60 is not used to shield the index table from the outside, although not shown, special-purpose covers are provided for these specifications, to protect devices that use the special-purpose covers.

In the index table 1 based on the left-hand specification, as viewed from the front of the rotating table 3 and as shown in FIGS. 1 to 5, the motor 8 is disposed at the surface 6 of the frame 2. On the other hand, in the index table 1 based on the right-hand specification, similarly, as viewed from the front of the rotating table 3 and as shown in FIGS. 6 and 7, the motor 8 is disposed at the other surface 7 of the frame 2.

In the embodiment, when the specification is changed, the motor 8 is removed from the surface 6 of the frame 2, is reversed by 180 degrees, and is mounted to the other surface 7. In addition, the worm shaft 11 is also reversed by 180 degrees, that is, the worm shaft 11 is mounted to the frame 2 with its left and right sides reversed. For maintaining engagement due to the reversing of the worm shaft 11, the worm wheel 13 is reversed by 180 degrees with respect to the rotating shaft 10, that is, the worm wheel 13 is reversed with respect to the rotating shaft 10 and is mounted in the opposite direction.

When the specification is changed, the left-hand specification may be changed to the right-hand specification or vice versa. Here, as an example, an operation procedure when changing the index table 1 based on the left-hand specification shown in FIGS. 1 to 5 to the index table 1 based on the right-hand specification shown in FIGS. 6 and 7 will be specifically described.

(1) First, the motor cover 60 is removed, and the motor 8 at the surface 6 is removed from the frame 2 along with the gear 14 and the gear mounting member 23. Then, the origin setting device 68, the clamp operation detecting device 67, and the distance 59 at the side of the surface 6 are removed. In addition, the stop member 76, the stop 75, and the two covers 65 at the side of the other surface 7 are removed, and the two hooks 80 on the frame 2 are reattached to the pair of hook internal threads 81 provided towards the surface 7.

(2) The bolt 29 is loosened, to remove the gear 15 from the worm shaft 11 along with a gear mounting member 28. The bolts 22 are removed, to remove the left bearing accommodation member 89 from the frame 2 along with the bearing 88. The bolts 22 are removed, to remove the worm shaft 11 from the surface-7 side, that is, from the right of the frame 2 along with the bearing accommodation member 18.

(3) The mounting bolt 87 is removed, to remove the oil seal holder 51 along with the oil seal 52. The hexagon-socket-head bolt 38 is removed, to remove the worm wheel 13 from the back end portion of the rotating shaft 10. The origin detection portion 57 is removed from the worm wheel 13, and is temporarily mounted to the flange portion 86 at the side further away from the worm wheel 13. Next, the worm wheel 13 is reversed in the opposite direction, that is, is reversed by 180 degrees, and is mounted to the rotating shaft 10. By this, the worm wheel mounting reference surface 19, which was in contact with one of the rotating shaft mounting reference surfaces 20 selected in the specification prior to changing the specification, comes into contact with the other rotating shaft mounting reference surface 20 that is selected. The oil seal holder 51 is mounted to the frame 2, and the oil seal 52 is mounted.

(4) The worm shaft 11 is reversed by 180 degrees along with the bearing accommodation member 18, has its left and right sides reversed compared with when it was incorporated on the basis of the previous left-hand specification, and is inserted into the frame 2 from the surface-6 side. The two bearing accommodation members 18 and 89 are secured to the opposite accommodation holes 16 of the frame 2 compared with those to which they were previously attached, and the worm 12 and the worm wheel 13 are made to engage each other.

(5) The projection length of the clearance adjusting bolt 25 is adjusted from the surface-6 side, that is, from the side further away from the motor 8, the axial-direction position of the bearing accommodation member 18 at the side further away from the motor 8 with respect to frame 2 is adjusted, and the axial-direction position of the worm shaft 11 with respect to the frame 2 is adjusted, to adjust the engagement clearance between the worm wheel 13 and the worm 12. The gear 15 is mounted to the worm shaft 11 through the gear mounting member 28. The origin setting device 68 is mounted to a predetermined position of the surface 7.

(6) The distance 59 is mounted to the surface 7 of the frame 2, the motor 8 is secured to the mounted distance 59, and the gear 14 at the output shaft 9 is made to engage the gear 15 at the worm shaft 11. The direction of rotation of the motor 8 is changed. The clamp operation detecting device 67 is mounted to a predetermined position of the surface 7.

(7) After re-setting the origin of the rotating table 3 by the origin setting device 68, the motor cover 60 is mounted to the distance 59. At this time, the terminal cover 64 and the window cover 70 are reattached, and the two covers 65, the stop member 76, and the stop 75 are mounted to the side further away from the motor.

By changing the mounting positions as described above, the index table 1 is changed from one based on the left-hand specification shown in FIGS. 1 to 5 to one based on the right-hand specification shown in FIGS. 6 and 7.

As discussed in the aforementioned (7), when the specification is changed, it is necessary to reset a reference position (origin position) for a rotation angle of the rotating table 3 by the origin setting device 68. The flange portions 86 are provided at radial-direction outer (edges) portions at respective end portions of the worm wheel 13; and the origin detection portion 57 is secured to the flange portion 86 at the side further away from the rotating table by, for example, a setscrew. In setting the origin, when the rotating table 3 is rotated in a predetermined direction, such as clockwise in FIG. 1, and a reference mark provided at the rotating table 3 matches a reference mark of the frame 2, the mounting position of the origin detection portion 57 is adjusted so that the origin proximity sensor 58 detects the origin detection portion 57.

In this embodiment, the flange portions 86 are provided at the respective end portions of the worm wheel 13, and, with a change in the specification, the origin detection portion 57 is reattached to another flange portion 86. However, the flange portion 86 may be provided at only one end portion of the worm wheel 13. In this case, the mounting direction of the worm wheel 13 based on the right-hand specification is opposite to that based on the left-hand specification, as a result of which the positions of the origin detection portion 57 are different from each other in the axial direction of the rotating shaft 10. Therefore, the mounting positions of the origin proximity sensor 58 based on the right-hand specification and based on the left-hand specification differ from each other at the surfaces 6 and 7 of the frame 2 in the axial direction of the rotating shaft 10, as a result of which the frame 2 is not symmetrically formed on the left and right sides.

In the embodiment, when the specification is changed, the bearing accommodation members 18 and 89 are reattached along with the bearings 17 and 88. However, for a device that does not use the worm 12 whose tooth thickness is gradually increased or decreased in the axial direction, or when the motor 8 is removed and an engagement clearance is adjusted depending upon the specification, it is not necessary to particularly make the diameters of the accommodation holes 16 the same to make the bearing accommodation members 18 and 89 reattachable. In this case, the shaft diameters of bearing fitting portions of the worm shaft 11 need to be equal to each other at the respective ends. Bearings having the same inner ring diameter are used as the bearings 17 and 88, or a bush is provided between the worm shaft 11 and the bearing having the larger inner ring diameter.

Second Embodiment

Figure 8:
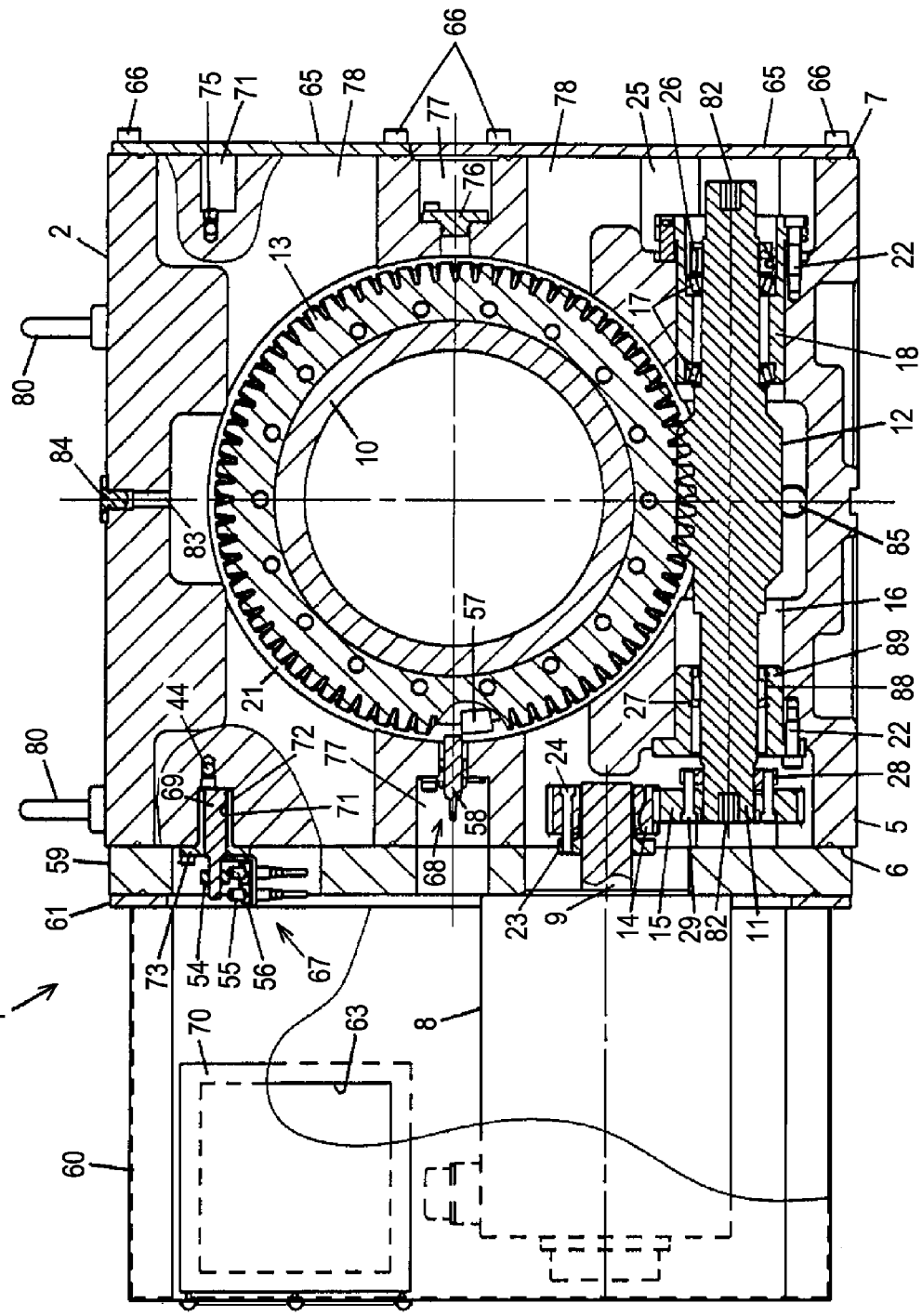
FIG. 8 is a sectional view of a portion of an index table 1 based on the left-hand specification in a second embodiment of the present invention.
Figure 9:
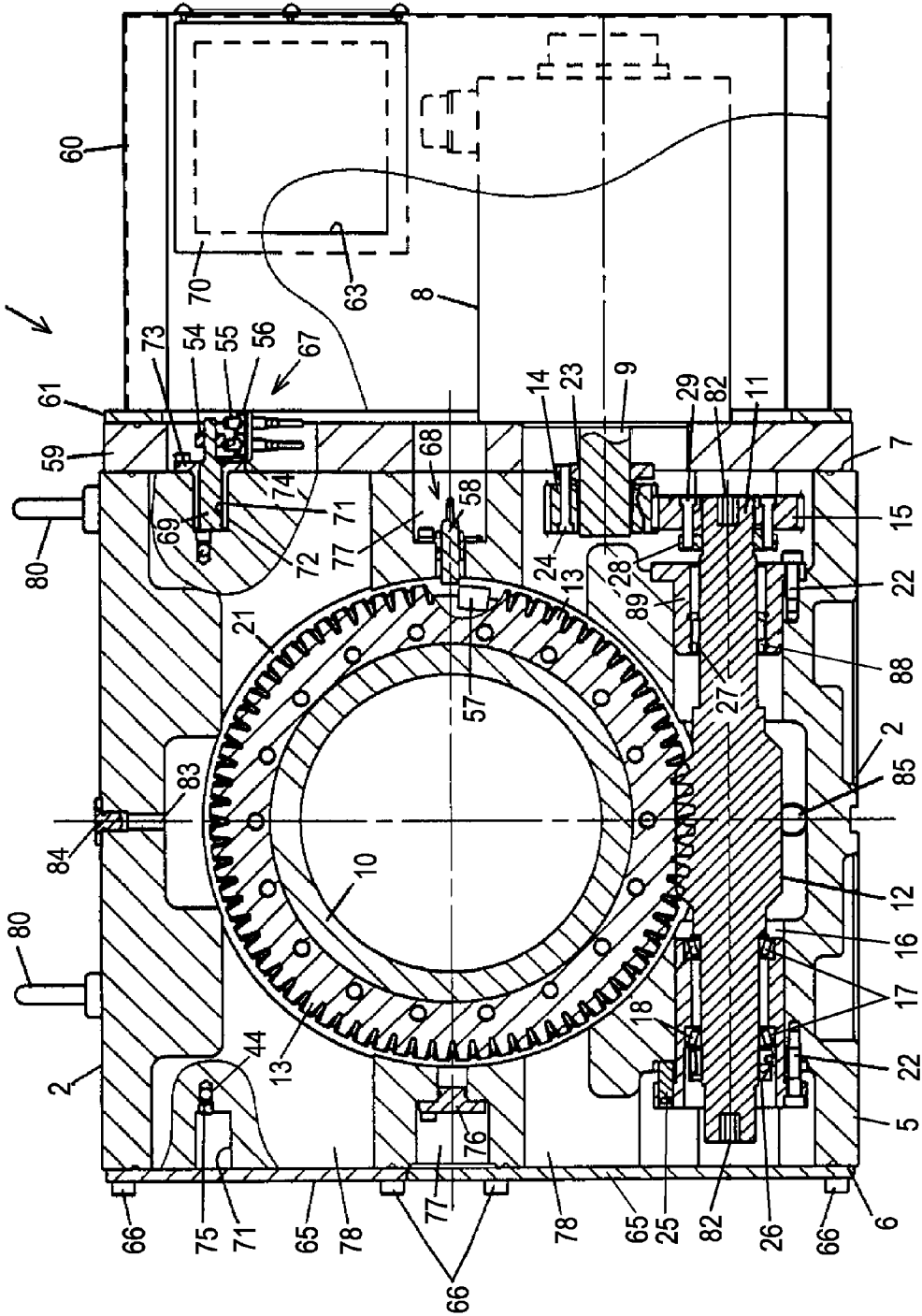
FIG. 9 is a sectional view of a portion of an index table 1 based on the right-hand specification in the second embodiment of the present invention.

FIGS. 8 and 9 each show an index table 1 according to a second embodiment of the present invention. FIG. 8 shows the index table 1 based on the left-hand specification, and FIG. 9 shows the index table 1 based on the right-hand specification.

The index tables 1 shown in FIGS. 8 and 9 basically have the same structure as those of the first embodiment. The worm shaft 11 is provided so that the tooth thickness of a worm 12 is gradually increased or decreased along an axial direction. However, to make it possible to reattach the gear 15, the diameters of respective ends of the worm shaft 11 are made the same. This is different from the first embodiment. In addition, the structure of the worm shaft 11 and supporting structures at respective end portions thereof are different. That is, in the first embodiment, the diameters of the two bearing fitting portions of the worm shaft 11 are different from each other, whereas, in the second embodiment, the diameters of the two bearing fitting portions of the worm shaft 11 are the same.

In the embodiment, although, when the specification is changed, the worm shaft 11 is not reversed by 180 degrees and is not reattached in the opposite direction, the bearings 17 and 88 can be reattached to the opposite sides because the shaft diameters are the same as mentioned above. Further, the diameters of both accommodation holes 16 are the same, so that the bearings 17 and 88 can be reattached to opposite sides along with the bearing accommodating members 18 and 89. When the bearing accommodation members 18 and 89 can be reattached, the bearing accommodation member 18 whose movement relative to the worm shaft 11 is restricted in the axial direction can be reattached to a side further away from the motor 8. Therefore, depending upon the specification, it is possible to prevent the bearing accommodation member 18 whose movement relative to the worm shaft 11 is restricted in the axial direction from being mounted to the motor-8 side. That is, in either specification, an engagement clearance between the worm 12 and the worm wheel 13 can be adjusted without removing the motor 8. At the respective ends of the worm shaft 11, hexagon sockets 82 for a hexagonal wrench are provided instead of the two parallel flat surfaces 79 provided at the end portions at the side further away from the motor of the worm 12 in the first embodiment. The worm shaft 11 can be rotated with a hand through the hexagonal wrench from any end portion of the worm shaft 11.

As described above, since, in the second embodiment, the worm shaft 11 is disposed in the same direction, even if the specification is changed, the direction of movement of the worm shaft 11 that makes the engagement clearance small is not changed. Therefore, for making the engagement clearance between the worm 12 and the worm wheel 13 small, in one of the specifications, a projection length of the clearance adjusting bolt 25 for adjusting the clearance is reduced, whereas, in the other specification, a projection length of the clearance adjusting bolt 25 for adjusting the clearance is increased.

Even in the second embodiment, the specification can be changed from the left-hand specification to the right-hand specification or vice versa. Hereunder, as an example, an operation procedure when changing the index table 1 based on the left-hand specification shown in FIG. 8 to the index table 1 based on the right-hand specification shown in FIG. 9 will be described in detail.

(1) First, the motor cover 60 is removed, and the motor 8 at the surface 6 is removed from the frame 2 along with the gear 14 and the gear mounting member 23. Then, the origin proximity sensor 58 of the origin setting device 68, the clamp operation detecting device 67, and the distance 59 at the side of the surface 6 are removed. In addition, the stop member 76, the stop 75, and the two covers 65 at the side of another surface 7 are removed, and the two hooks 80 on the frame 2 are reattached to the pair of hook internal threads 81 provided towards the surface 7.

(2) The bearing restricting member 26 is removed from the worm shaft 11. The bolt 29 is loosened to remove the gear 15 from the worm shaft 11 along with the gear mounting member 28. The bolts 22 are removed to remove the right and left bearing accommodation members 18 and 89 from the frame 2 along with the bearings 17 and 88.

(3) The removed bearing accommodation members 18 and 89 are temporarily attached to the accommodation holes 12 of the frame 2 that are opposite to those to which they were previously attached, and the worm 12 and the worm wheel 13 are made to engage each other. The bearing restricting member 26 is secured to the worm shaft 11, and relative movement in the axial direction between the worm shaft 11 and the bearing accommodation member 18 at the side further away from the motor 8 is restricted. Both of the bearing accommodation members 18 and 89 are secured to the frame 2.

(4) A projection length of the clearance adjusting bolt 25 is adjusted from a left surface portion, to adjust an engagement clearance between the worm wheel 13 and the worm 12 to a suitable clearance. The gear 15 is mounted to the worm shaft 11 through the gear mounting member 28. The origin setting device 68 is mounted to a predetermined position of the surface 7.

(5) The distance 59 is mounted to the surface 7 of the frame 2, the motor 8 is secured to the mounted distance 59, and the gear 14 at the output shaft 9 is made to engage the gear 15 at the worm shaft 11. The direction of rotation of the motor 8 is changed. The clamp operation detecting device 67 is mounted to a predetermined position of the surface 7.

(6) With the reattachment of the origin proximity sensor 58, operations similar to those in the first embodiment are performed so that, after re-setting the origin of the rotating table 3 by the origin setting device 68, the motor cover 60 is mounted to the distance 59. At this time, the terminal cover 64 and the window cover 70 are reattached, and the two covers 65, the stop member 76, and the stop 75 are mounted to the side further away from the motor.

By the above-described operations of changing the mounting positions, the index table 1 is changed from one based on the left-hand specification shown in FIG. 8 to one based on the right-hand specification shown in FIG. 9.

In the embodiment, when the specification is changed, even though the worm shaft 11 is not reattached in the opposite direction as it is in the first embodiment, the bearing accommodation members 18 and 89 are reattached along with the bearings 17 and 88. However, for a device that does not use the worm 12 whose tooth thickness is gradually increased or decreased in the axial direction, or when the motor 8 is removed and an engagement clearance is adjusted depending upon the specification, it is not necessary to particularly reattach the bearings 17 and 88 and the bearing accommodation members 18 and 89. In this case, the shaft diameters of the two bearing fitting portions of the worm shaft 11 may be different from each other, or the diameters of the two accommodation holes of the frame 2 may be different from each other.

Although, in the above-described embodiments, the motor 8 is of a type in which the output shaft 9 is orthogonal to the mounting surface that is mounted to the surface 6 or 7, the motor 8 may be of a type in which the output shaft 9 is parallel to the mounting surface that is mounted to the surface 6 or 7. In this case, for example, a pair of bevel gears are used as transmitting elements, and are mounted to the output shaft 9 and the worm shaft 11 and engage each other. With a change in the specification, the motor 8 is reattached, and, for example, the bevel gears and covers of, for example, the motor 8 and the bevel gears are reattached.

INDUSTRIAL APPLICABILITY

The index table 1 may be attached to the machine tool from the beginning, or may be attached afterwards to the machine tool.

The present invention is not limited to the above-described embodiments, so that various modifications may be made without departing from the gist of the present invention.

The invention claimed is:

1. An index table in which a rotating table is rotatably supported at a frame by a rotating shaft, a setting surface is provided at the frame orthogonal to a rotating table surface of the rotating table, a motor is disposed at one surface among two surfaces of the frame that are orthogonal to the rotating table surface and the setting surface, a worm shaft is disposed orthogonal to the two surfaces of the frame, a worm wheel that engages a worm provided at the worm shaft is provided at the rotating shaft, an output shaft of the motor is connected to an end portion of the worm shaft at a side of the one surface through transmitting elements, and the motor drives the rotating table through the transmitting elements, the worm of the worm shaft, and the worm wheel, wherein a tooth thickness of the worm gradually increases or decreases along an axial direction, wherein the motor is mountable to the one surface and to the other surface among the two surfaces, wherein, when mounting the motor to the other surface by removing the motor from the one surface, the worm shaft is mounted to the frame in an opposite direction with left and right sides of the worm shaft being reversed, and the worm wheel is reversed to mount the worm wheel to the rotating shaft in an opposite direction, and wherein the output shaft of the motor is connected to an end portion of the worm shaft at a side of the other surface through the transmitting elements.

2. The index table according to claim 1, wherein the both end portions of the worm shaft are formed so as to be connectable to the output shaft of the motor through the transmitting elements, and wherein, when the motor is mounted to the other surface of the frame, one of the end portions of the worm shaft and the output shaft of the motor are disconnected from each other, and the other end portion of the worm shaft and the output shaft of the motor are connected to each other.

3. The index table according to claim 1, wherein the one surface and the other surface of the frame each have an accommodation hole, the accommodation holes having the same diameter, wherein two bearing accommodation members are provided, the two bearing accommodation members being fitted to the respective accommodation holes, and supporting respective ends of the worm shaft through bearings, wherein the bearing accommodation member that is fitted to the accommodation hole at the side of the other surface is such that, while a movement thereof relative to the worm shaft is restricted in an axial direction of the worm shaft, the end portion of the worm shaft at the side of the other surface is supported, and a securing position thereof with respect to the frame is adjustable in the axial direction, and wherein, when the motor is mounted to the other surface of the frame, the bearing accommodation member at the side of the other surface is removed from the accommodation hole of the other surface and is fitted to the accommodation hole of the one surface; and, by adjusting the securing position of the bearing accommodation member with respect to the frame, a position of the worm shaft in the axial direction is adjusted, so that an engagement clearance between the worm and the worm wheel is adjusted.

4. The index table according to claim 1, wherein the rotating shaft is provided with a flat worm wheel mounting reference surface that spreads in a radial direction, wherein the worm wheel is provided with rotating shaft mounting reference surfaces at respective end portions thereof, wherein both of the rotating shaft mounting reference surfaces are provided at equal distances in an axial direction from a center of curvature of teeth of the worm wheel, and wherein the worm wheel mounting reference surface is selectively in contact with one of the rotating shaft mounting reference surfaces.

* * * * *